(12) United States Patent
Iskandar et al.

(10) Patent No.: US 11,657,122 B2
(45) Date of Patent: May 23, 2023

(54) ANOMALY DETECTION FROM AGGREGATE STATISTICS USING NEURAL NETWORKS

(71) Applicant: Applied Materials, Inc., Santa Clara, CA (US)

(72) Inventors: Jimmy Iskandar, Fremont, CA (US); Michael D. Armacost, San Jose, CA (US)

(73) Assignee: Applied Materials, Inc., Santa Clara, CA (US)

(*) Notice: Subject to any disclaimer, the term of this patent is extended or adjusted under 35 U.S.C. 154(b) by 369 days.

(21) Appl. No.: 16/947,052

(22) Filed: Jul. 16, 2020

(65) Prior Publication Data

US 2022/0019863 A1 Jan. 20, 2022

(51) Int. Cl.
 *G06K 9/62* (2022.01)
 *G06N 3/04* (2006.01)

(52) U.S. Cl.
 CPC ......... *G06K 9/6298* (2013.01); *G06K 9/6284* (2013.01); *G06K 9/6289* (2013.01); *G06N 3/04* (2013.01)

(58) Field of Classification Search
 CPC ............ G05B 23/0283; G05B 23/0221; G06K 9/6252; G06K 9/6298; G01N 25/72
 See application file for complete search history.

(56) References Cited

U.S. PATENT DOCUMENTS

| | | |
|---|---|---|
| 2008/0021677 A1 | 1/2008 | Buxton et al. |
| 2008/0178676 A1* | 7/2008 | Liasi ........................ G01H 1/00 73/593 |
| 2010/0031156 A1 | 2/2010 | Doyle et al. |
| 2012/0316835 A1* | 12/2012 | Maeda ................. G06K 9/6252 702/183 |
| 2016/0070709 A1* | 3/2016 | Luan ................... G06Q 30/0282 707/728 |
| 2017/0024649 A1 | 1/2017 | Yan et al. |
| 2018/0181750 A1* | 6/2018 | Lamothe-Brassard ...................... G06F 21/554 |
| 2019/0353703 A1* | 11/2019 | He ........................ G06F 17/148 |

FOREIGN PATENT DOCUMENTS

KR 10-2018-0074188 A 7/2018

OTHER PUBLICATIONS

International Search Report and Written Opinion for International Application No. PCT/US2021/041885, dated Oct. 6, 2021, 7 pages.

* cited by examiner

*Primary Examiner* — Clifford Hilaire
(74) *Attorney, Agent, or Firm* — Lowenstein Sandler LLP

(57) ABSTRACT

Implementations disclosed describe a method and a system to perform the method of obtaining a reduced representation of a plurality of sensor statistics representative of data collected by a plurality of sensors associated with a device manufacturing system performing a manufacturing operation. The method further includes generating, using a plurality of outlier detection models, a plurality of outlier scores, each of the plurality of outlier scores generated based on the reduced representation of the plurality of sensor statistics using a respective one of the plurality of outlier detection models. The method further includes processing the plurality of outlier scores using a detector neural network to generate an anomaly score indicative of a likelihood of an anomaly associated with the manufacturing operation.

20 Claims, 7 Drawing Sheets

ANOMALY DETECTION FROM AGGREGATE STATISTICS USING NEURAL NETWORKS

TECHNICAL FIELD

This instant specification generally relates to controlling quality of processing and product yield in systems used in electronic device manufacturing, such as various processing chambers. More specifically, the instant specification relates to monitoring quality of processing and product yield using statistical data aggregated from multiple sensors and analyzed using neural networks.

BACKGROUND

Manufacturing of modern materials often involves various deposition techniques, such as chemical vapor deposition (CVD) or physical vapor deposition (PVD) techniques, in which atoms or molecules of one or more selected types are deposited on a wafer (substrate) held in low or high vacuum environments that are provided by vacuum processing (e.g., deposition, etching, etc.) chambers. Materials manufactured in this manner may include monocrystals, semiconductor films, fine coatings, and numerous other substances used in practical applications, such as electronic device manufacturing. Many of these applications depend on the purity and specifications of the materials grown in the processing chambers. The quality of such materials, in turn, depend on adherence of the manufacturing operations to correct process specifications. To maintain isolation of the inter-chamber environment and to minimize exposure of wafers to ambient atmosphere and contaminants, various sensor detection techniques are used to monitor processing chamber environment, wafer transportation, physical and chemical properties of the products, and the like. Improving precision, reliability, and efficiency of such monitoring presents a number of technological challenges whose successful resolution facilitates continuing progress of electronic device manufacturing and helps to meet the constantly increasing demands to the quality of the products of semiconductor device manufacturing.

SUMMARY

Figure 1:
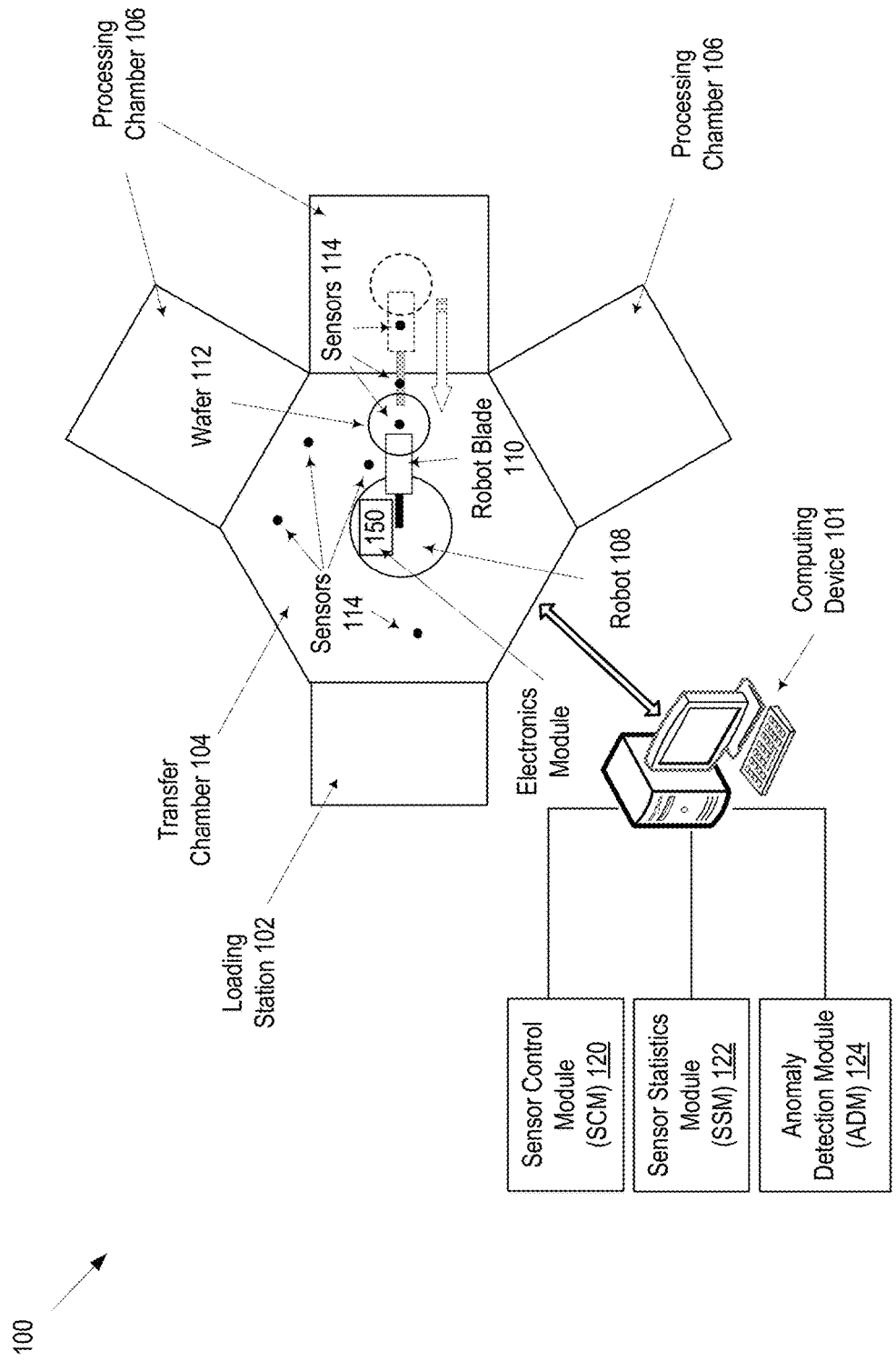
FIG. 1 illustrates one exemplary implementation of a manufacturing machine capable of supporting anomaly detection based on aggregate statistics using neural networks, in accordance with some implementations of the present disclosure.

In one implementation, disclosed is a method that includes obtaining a reduced representation of a plurality of sensor statistics representative of data collected by a plurality of sensors associated with a device manufacturing system performing a manufacturing operation. The method further includes generating, using a plurality of outlier detection models, a plurality of outlier scores, wherein each of the plurality of outlier scores is generated based on the reduced representation of the plurality of sensor statistics using a respective one of the plurality of outlier detection models. The method further includes processing the plurality of outlier scores using a detector neural network to generate an anomaly score indicative of a likelihood of an anomaly associated with the manufacturing operation.

In another implementation, disclosed is a system that includes a memory and a processing device, operatively coupled to the memory, to obtain a reduced representation of a plurality of sensor statistics representative of data collected by a plurality of sensors associated with a device manufacturing system performing a manufacturing operation and generate, using a plurality of outlier detection models, a plurality of outlier scores, wherein each of the plurality of outlier scores is generated based on the reduced representation of the plurality of sensor statistics using a respective one of the plurality of outlier detection models. The processing device is further to process the plurality of outlier scores using a detector neural network to generate an anomaly score indicative of a likelihood of an anomaly associated with the manufacturing operation.

In another implementation, disclosed is a non-transitory computer readable storage medium storing instructions that, when executed by a processing device, cause the processing device to obtain a reduced representation of a plurality of sensor statistics representative of data collected by a plurality of sensors associated with a device manufacturing system performing a manufacturing operation and generate, using a plurality of outlier detection models, a plurality of outlier scores, wherein each of the plurality of outlier scores is generated based on the reduced representation of the plurality of sensor statistics using a respective one of the plurality of outlier detection models. The processing device is further to process the plurality of outlier scores using a detector neural network to generate an anomaly score indicative of a likelihood of an anomaly associated with the manufacturing operation.

DETAILED DESCRIPTION

The implementations disclosed herein provide for efficient automated control of device manufacturing processes and quality of manufacturing yield. The implementations disclosed provide for universal handling of large amounts of statistical data from multiple sensors supplying a stream of real-time data about the manufacturing system and processes performed therein. For example, the implementations disclosed can help accurately detect when an anomaly in a manufacturing process and/or a product of the process, arises that indicates a deterioration of the product yield.

The robotic delivery and retrieval of wafers, as well as maintaining controlled environments in loading, processing, and transfer chambers improve speed, efficiency, and quality of the device manufacturing. Typical device manufacturing processes often require tens and even hundreds of steps, e.g., introducing a gas into a processing chamber, heating the chamber environment, changing a composition of gas, purging a chamber, pumping the gas out, changing pressure, moving a wafer from one position to another, creating or adjusting a plasma environment, performing etching or deposition steps, and so on. The very complexity of the manufacturing technology requires processing a constant stream of run-time data from various sensors placed inside the manufacturing system. Such sensor may include temperature sensors, pressure sensors, chemical sensors, gas flow sensors, motion sensors, position sensor, optical sensors, and other types of sensors. The manufacturing system can have multiple sensors of the same (or similar) type distributed throughout various parts of the system. For example, a single processing chamber can have multiple chemical sensors to detect concentration of chemical vapor at various locations within the processing chamber and can similarly have multiple temperature sensors to monitor a temperature distribution. Some or all of the sensors can output a constant stream of data. For example, a temperature sensor can output a temperature reading ever second (or more frequently) so that a single etching step that takes several minutes to perform can be generate hundreds of data points from this sensor alone.

Each sensor (alone or in combination with other sensors) can output data that are indicative of a sudden or gradual detrimental changes in the environment or in the settings of the manufacturing process. A human operator typically reads the data and monitors whether the manufacturing process conforms to the process specifications. A large number of sensors that provide data about multiple wafers being processed in multiple chambers often requires many human operators. Such approach, however, has a number of disadvantages. First, it significantly increases the costs of the manufacturing. Second, it introduces a subjective component to process monitoring where the same output data can cause different operators to make different decisions regarding the manufacturing conditions and, therefore, make different adjustments to the process. Third, when different operators are assigned to monitor different sensor types (e.g., one operator is assigned to control pressure, temperature, and optical sensor data whereas another operator controls chemical composition data), some deviations from the normal processing can be overlooked, at least at early stages of its development. Namely, an insignificant change in the reading of a pressure sensor or an insignificant change in the output of a chemical composition sensor can be inconsequential when each occur on its own but can signal a start if an anomaly when occurring simultaneously. The setting in which multiple operators have divided responsibilities can miss early indication of deteriorated processing that can only be revealed form cross-sensor correlations. Fourth, much of sensor statistics can have a limited information content. Extracting key features from the statistics can require developing specific models of anomaly detection. Such models can be sensor-specific as different types of sensors can indicate an anomaly of the manufacturing process via different key feature. For example, while some sensor types can indicate an anomaly through a certain percentage of outliers, other types can do so via a spread of the variance or an appearance of skewness.

Aspects and implementations of the present disclosure address these and other shortcomings of the sensor technology that can be used in semiconductor device manufacturing. Described herein are implementations in which multiple sensor statistics are pre-processed, dimensionality of the sensor statistics is reduced, the reduced representations of statistics are processed by multiple anomaly detection models, normalized, and processed by a detector neural network to determine one or more anomaly scores. The anomaly score(s) can indicate a degree to which one or more anomalies of the manufacturing process are occurring. Pre-processing can remove artifacts that can be associated with preventive maintenance, intended changes in the settings of the manufacturing processes, changes in the settings of the system hardware, and the like. The reduction in the representation of the statistics can be performed by another (e.g., a reducer) neural network to distill the statistics to the most representative features. The anomaly detection models can identify various features present in the reduced representation of statistics. The trained detector neural network can use features output by the anomaly detection models (in some implementations, normalized) and predict the anomaly score(s). Some of the listed operations can be optional, performed for additional accuracy and efficiency of the anomaly score prediction. Such aggregated approach to inhomogeneous sensor statistics can significantly reduce the need for human control over the sensor technology and improve efficiency of anomaly detection.

The disclosed implementations pertain to a variety of manufacturing techniques that use processing chambers (that may include deposition chambers, etching chambers, and the like), such as chemical vapor deposition techniques (CVD), physical vapor deposition (PVD), plasma-enhanced CVD, plasma-enhanced PVD, sputter deposition, atomic layer CVD, combustion CVD, catalytic CVD, evaporation deposition, molecular-beam epitaxy techniques, and so on. The disclosed implementations may be employed in techniques that use vacuum deposition chambers (e.g., ultrahigh vacuum CVD or PVD, low-pressure CVD, etc.) as well as in atmospheric pressure deposition chambers.

FIG. 1 illustrates one exemplary implementation of a manufacturing machine 100 capable of supporting anomaly detection based on aggregate statistics using neural networks, in accordance with some implementations of the present disclosure. For example, the manufacturing machine 100 can be wafer fabrication equipment with various processing chambers. In one implementation, the manufacturing machine 100 includes a loading station 102, a transfer chamber 104, and one or more processing chambers 106. The processing chamber(s) 106 may be interfaced to the transfer chamber 104 via transfer ports (not shown). The number of processing chamber(s) associated with the transfer chamber 104 may vary (with three processing chambers indicated in FIG. 1, as a way of example). Additionally, the design and shape of the transfer chamber 104 may vary. In the illustrated embodiment, the transfer chamber 104 has a hexagonal shape with each side being of approximately equal width. In other embodiments, the transfer chamber 104 may have four, five, seven, eight, or more sides. Additionally, different sides may have different widths or lengths. For example, the transfer chamber 104 may have four sides and be of rectangular shape or of square shape. In another example, the transfer chamber may have five sides and be of a wedge shape. As shown, each side of the transfer chamber 104 is connected to a single processing chamber 106. However, in other implementations one or more of the sides may be connected to multiple processing chambers. For example, a first side may be connected to two processing chambers, and a second side may be connected to one processing chamber.

The transfer chamber 104 may include a robot 108, a robot blade 110, and an optical inspection tool for accurate optical inspection of a wafer 112 that is being transported by the robot blade 110 after processing in one of the processing chambers 106. The transfer chamber 104 may be held under pressure (temperature) that is higher (or lower) than the atmospheric pressure (temperature). The robot blade 110 may be attached to an extendable arm sufficient to move the robot blade 110 into the processing chamber 106 to retrieve the wafer in chamber 116 after the processing of the wafer is complete.

The robot blade 110 may enter the processing chamber(s) 106 through a slit valve port (not shown) while a lid to the processing chamber(s) 106 remains closed. The processing chamber(s) 106 may contain processing gases, plasma, and various particles used in deposition processes. A magnetic field may exist inside the processing chamber(s) 106. The inside of the processing chamber(s) 106 may be held at temperatures and pressures that are different from the temperature and pressure outside the processing chamber(s) 106.

The manufacturing machine 100 may have one or more sensors 114. Each sensor 114 may be a temperature sensor, pressure sensor, chemical detection sensor, chemical composition sensor, gas flow sensor, motion sensor, position sensor, optical sensor, or any and other type of sensors. Some or all of the sensors 114 may include a light source to produce light (or any other electromagnetic radiation), direct it towards a target, such as a component of the machine 100 or a wafer, a film deposited on the wafer, etc., and detect light reflected from the target. The sensors 114 can be located anywhere inside the manufacturing machine 100 (for example, within any of the chambers including the loading stations, on the robot 108, on the robot blade 110, between the chambers, and so one), or even outside the manufacturing machine 100 (where the sensors can test ambient temperature, pressure, gas concentration, and so on).

In some implementations, a computing device 101 may control operations of the manufacturing machine 100 and its various tools and components, including operations of the robot 108, operations that manage processes in the processing chambers 106, operations of the sensors 114, and so on. The computing device 101 may communicate with an electronics module 150 of the robot 108 and with the sensors 114. In some implementations, such communication may be performed wirelessly. The computing device 101 may control operations of the robot 108 and may also receive sensing data from the sensors 114, including raw sensors data or sensor data that undergoes preliminary processing (such as conversion from analog to digital format) by sensors 114 or by another processing device, such as a microcontroller of the electronics module 150 or any other processing device of the manufacturing machine 100. In some implementations, some of the sensor data is processed by the electronics module 150 whereas some of the sensor data is processed by the computing device 101. The computing device 101 may include a sensor control module (SCM) 120. The SCM 120 may activate sensors, deactivate sensors, place sensors in an idle state, change settings of the sensors, detect sensor hardware or software problems, and so on. In some implementations, the SCM 120 may keep track of the processing operations performed by the manufacturing machine 100 and determine which sensors 114 are to be sampled for a particular processing (or diagnostic, maintenance, etc.) operation of the manufacturing machine 100. For example, during a chemical deposition step inside one of the processing chambers 106, the SCM may sample sensors 114 that are located inside the respective processing chamber 106 but not activate (or sample) sensors 114 located inside the transfer chamber 104 and/or the loading station 102. The raw data obtained by the SCM 120 may include time series data where a specific sensor 114 captures or generates one or more readings of a detected quantity at a series of times. For example, a pressure sensor may generate N pressure readings $P(t_i)$ at time instances $t_1, t_2, \ldots t_N$. In some implementations, the raw data obtained by the SCM 120 may include spatial maps at a pre-determined set of spatial locations. For example, an optical reflectivity sensor may determine reflectivity of a film deposited on the surface of a wafer, $R(x_j, y_l)$, at a set (e.g., a two-dimensional set) of spatial locations $x_j, y_k$, on the surface of the film/wafer. In some implementations, both the time series and the spatial maps raw data can be collected. For example, as the film is being deposited on the wafer, the SCM 120 can collect the reflectivity data from various locations on the surface of the film and at a set of consecutive instances of time, $R(t_i, x_j, y_l)$.

The computing device 101 may further include a sensor statistics module (SSM) 122. The SSM 122 may process the raw data obtained by the SCM 120 from the sensors 114 and determine statistics representative of the raw data. For example, for each or some of the raw sensor data distributions, the SCM 120 may determine one or more parameters of the distribution, such as a mean, a median, a mode, an upper bound, a lower bound, a variance (or a standard deviation), a skewness (third moment), a kurtosis (fourth moment), or any further moments or cumulants of the data distribution. In some implementations, the SCM may model (e.g., via regression analysis fitting) the raw data with various model distributions (normal distribution, log-normal distribution, binomial distribution, Poisson distribution, Gamma distribution, or any other distribution. In such implementations, the one or more parameters may include an identification of the fitting distribution being used together with the fitting parameters determined by the SCM 120. In some implementations, the SCM may use multiple distributions to fit the raw data from one sensor, e.g., a main distribution and a tail distribution for outlier data points.

The parameters of the distributions obtained by the SCM 120 may be sensor-specific. For example, for some sensors a small number of parameters may be determined (mean, median, variance) whereas for some sensor many more (e.g., 10 or 20) moments may be determined. The computing device 101 may also include an anomaly detection module (ADM) 124 to process, aggregate, and analyze the statistics collected by the SSM 122. As described in more details below, in reference to FIGS. 3 and 4, the ADM 124 may pre-process, reduce the dimensionality of the sensor statistics, process the reduced representations of statistics by multiple anomaly detection models, normalize, and process using a detector neural network to determine one or more anomaly scores. At least some of the listed operations may include machine learning.

Figure 2:
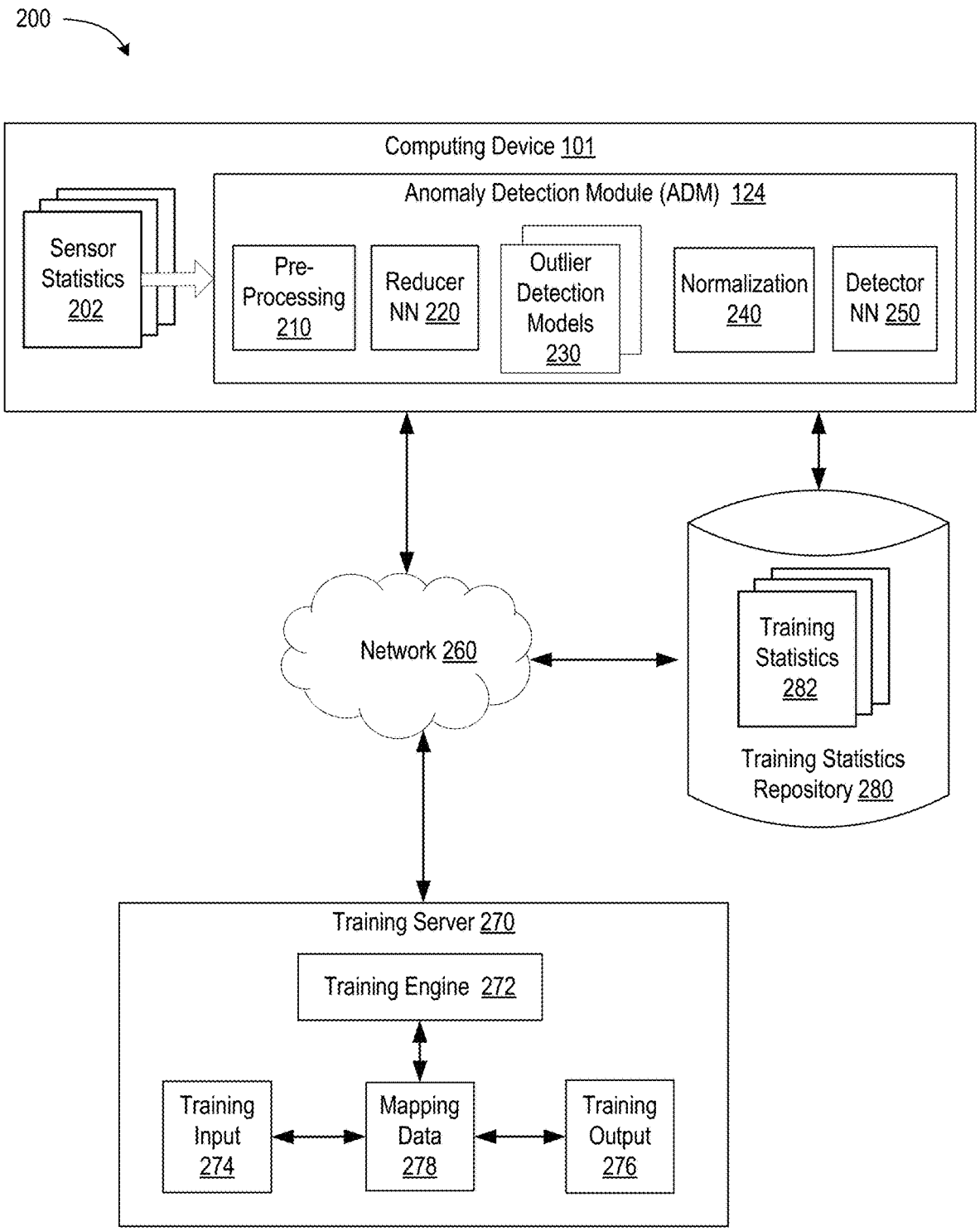
FIG. 2 is an exemplary illustration of a machine learning system that is capable of anomaly detection based on aggregate statistics using neural networks, in accordance with some implementations of the present disclosure.

FIG. 2 is an exemplary illustration of a machine learning system 200 that is capable of anomaly detection based on aggregate statistics using neural networks, in accordance with some implementations of the present disclosure. As illustrated, the machine learning system 200 may include a computing device 101, a training statistics repository 280, and a training server 270 connected to a network 260. Network 260 may be a public network (e.g., the Internet), a private network (e.g., a local area network (LAN) or wide area network (WAN)), or a combination thereof. Depicted in FIG. 2 is a set of sensor statistics 202 (which may be generated by SSM 122 based on raw data obtained by the SCM 120 from sensors 114) that can be processed by the ADM 124. The ADM 124 may include a number of components (implemented in software and hardware), such as pre-processing module 210, reducer neural network 220, one or more outlier detection models 230, normalization module 240, detector neural network 250, and other components not depicted explicitly in FIG. 2.

The pre-processing module 210 may remove artifacts that can be associated with preventive maintenance, intended changes in the settings of the manufacturing processes, changes in the settings of the system hardware, and the like, to produce the initial representation of sensor statistics. The initial representation of sensor statistics may be aggregated statistics for some or all the sensor data. The reducer neural network 220 (herein referred to as simply the "reducer 220") may reduce the statistics prepared by the pre-processing 210 and transform the initial representation of the statistics to a different representation (referred herein as the reduced representation) that includes the most representative features of the statistics and has fewer elements (e.g., parameters) than the initial representation. The outlier detection models 230 may identify various (statistical) features present in the reduced representation of statistics. The identified statistical features may be cast in the form of outlier scores amenable to neural network processing. The normalization module 240 can normalize the inhomogeneous outputs (outlier scores) of various detection models to prepare the outputs for the neural network processing. The detector neural network 250 (herein sometimes referred to as the "detector 250") may use the normalized features output by the outlier detection models 230 and predict the anomaly score for the manufacturing process.

The reducer 220 and/or the detector 250 may be trained by the training server 135. The training server 235 may be (and/or include) a rackmount server, a router computer, a personal computer, a laptop computer, a tablet computer, a desktop computer, a media center, or any combination thereof. The training server 270 may include a training engine 272. The training engine 272 may construct the machine learning models (e.g., neural networks 220 and 250), in some implementations. The neural networks 220 and 250 may be trained by the training engine 272 using training data that includes training inputs 274 and corresponding training (target) outputs 276. In some implementations, the reducer 220 and the detector 250 may be trained separately.

The training outputs 276 may include correct associations (mappings) of training inputs 274 to training outputs 276. The training engine 272 may find patterns in the training data that map the training input 274 to the training output 276 (e.g., the associations to be predicted), and train the reducer 220 and/or detector 250 to capture these patterns. The patterns can subsequently be used by the reducer 220 and/or detector 250 for future data processing and anomaly detection. For example, upon receiving a set of sensor statistics 202, the trained reducer 220 and/or detector 250 may be capable of identifying if the sensor statistics 202 are indicative of a manufacturing anomaly, such as one or more operations or products of the manufacturing machine 100 deviating from the respective process recipes or product specifications.

Each of the neural networks 220 and 250 may include a single level of linear or non-linear neural operations, in various implementations. In some implementations, the neural networks 220 and 250 may be deep neural networks having multiple levels of linear or non-linear operations. Examples of deep neural networks are neural networks including convolutional neural networks, recurrent neural networks (RNN) with one or more hidden layers, fully connected neural networks, Boltzmann machines, and so on. In some implementations, the neural networks 220 and 250 may include multiple neurons wherein each neuron may receive its input from other neurons or from an external source and may produce an output by applying an activation function to the sum of weighted inputs and a trainable bias value. The neural networks 220 and 250 may include multiple neurons arranged in layers, including an input layer, one or more hidden layers, and an output layer. Neurons from adjacent layers may be connected by weighted edges. Initially, all the edge weights may be assigned some starting (e.g., random) values. For every training input 274 in the training dataset, the training engine 272 may cause the neural networks 220 and 250 to generate outputs (predicted anomaly scores for a set of training sensor statistics). The training engine 272 may compare the observed output of the neural networks 220 and 250 with the target training output 276. The resulting error, e.g., the difference between the target training output and the actual output of the neural networks, may be propagated back through the neural networks 220 and 250, and the weights and biases in the neural networks may be adjusted to make the actual outputs closer to the training outputs. This adjustment may be repeated until the output error for a particular training input 274 satisfies a predetermined condition (e.g., falls below a predetermined value). Subsequently, a different training input 274 may be selected, a new output generated, a new series of adjustments implemented, until the neural networks are trained to an acceptable degree of accuracy.

The training inputs 274, the training outputs 276, and the mapping data 278 may be stored, as part of the training statistics 282, in the training statistics repository 280, which may be accessible to the computing device 101 directly or via network 260. The training statistics 282 may be actual, e.g., past statistics of sensors 114 of the manufacturing machine 100 or a similar type machine (e.g. one or more machine used by a developer to train the neural networks 220 and 250). The training statistics 282 may include a wide variety of statistics representative of an occurrence (or non-occurrence) of a particular manufacturing anomaly, such as incorrect temperature, pressure, chemical compositions regimes, deficient (or normal) film, wafer, or any other product of the manufacturing machine 100 (or a similar machine). The training statistics 282 may include examples of anomalies present in the manufacturing process to various degrees, such as a significant anomaly that results in a sub-standard yield, a correctable anomaly that can be eliminated with timely and appropriate counter-measures, an insignificant anomaly that is unlikely to affect the quality of the manufacturing output, and so on. In some implementations, the presence of the anomaly in the training statistics 282 may be indicated by a continuous or quasi-continuous anomaly score (e.g., a value within the 0.0 to 1.0 range, or 0 to 100 range, or any other range). Anomaly score in the training statistics 282 may be a part of the training output 276.

The training statistics repository 280 may be a persistent storage capable of storing sensor data or sensor data statistics as well as metadata for the stored data/statistics. The training statistics repository 280 may be hosted by one or more storage devices, such as main memory, magnetic or optical storage based disks, tapes or hard drives, NAS, SAN, and so forth. Although depicted as separate from the computing device 101, in some implementations the training statistics repository 280 may be a part of the computing device 101. In some implementations, the training statistics repository 280 may be a network-attached file server, while in other implementations the training statistics repository 280 may be some other type of persistent storage, such as an object-oriented database, a relational database, and so forth, that may be hosted by a server machine or one or more different machines coupled to the computing device 101 via the network 260.

Once the neural networks 220 and 250 are trained, the trained neural networks may be provided to the ADM 124 for processing of new sensor statistics. For example, the ADM 124 may receive a new set of sensor statistics 202, pass it through some or all of the components of the ADM 124, e.g., pre-processing 210, reducer 220, one or more outlier detection models 230, normalization module 240, and detector network 250 to predict an anomaly score representative of a likelihood that the sensor statistics 202 is indicative of a manufacturing anomaly.

"Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor, which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. A processing device may also be referred to as a CPU. "Memory device" herein refers to a volatile or non-volatile memory, such as random-access memory (RAM), read-only memory (ROM), electrically erasable programmable read-only memory (EEPROM), or any other device capable of storing data.

Figure 3:
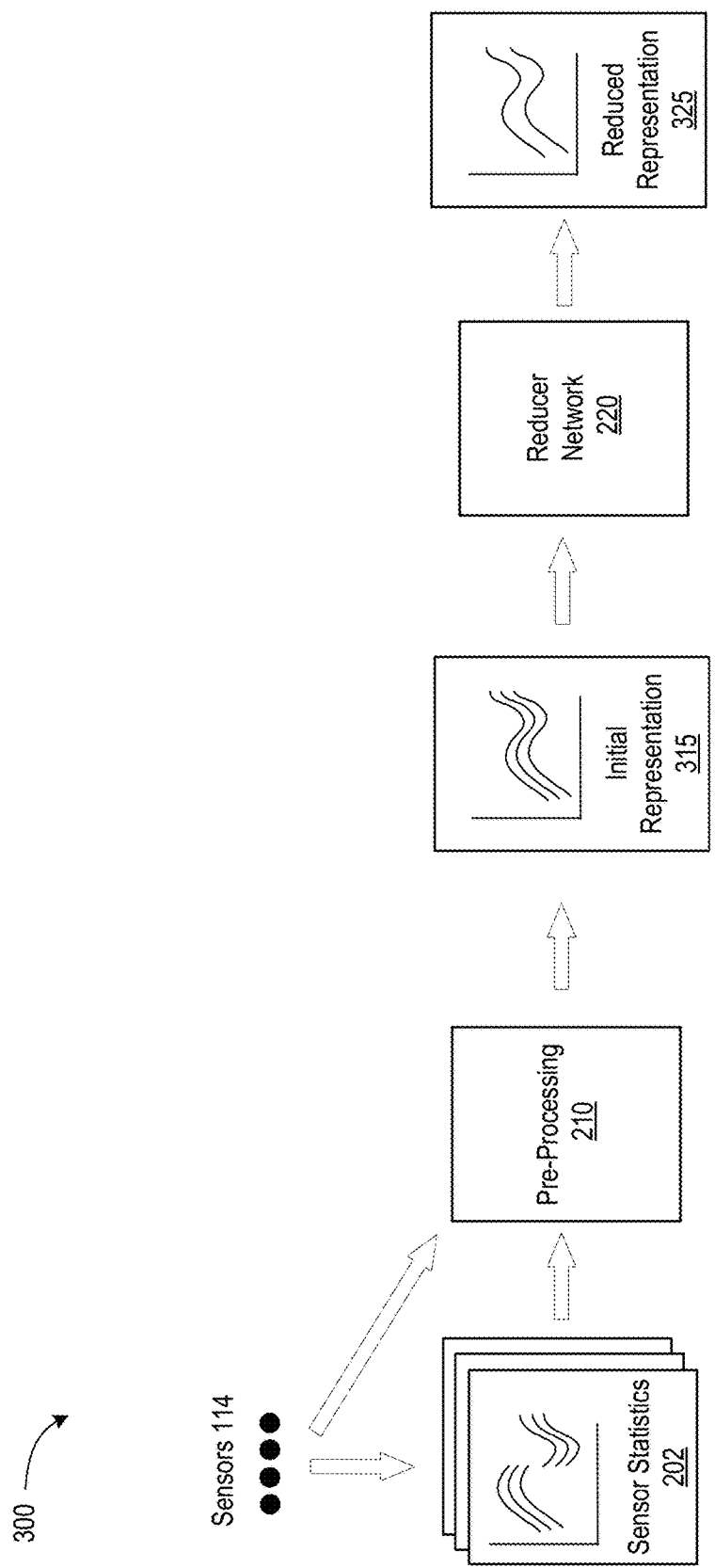
FIG. 3 is an exemplary illustration of a reduction stage of anomaly detection based on aggregate statistics using neural networks, in accordance with some implementations of the present disclosure.

FIG. 3 is an exemplary illustration of a reduction stage 300 of anomaly detection based on aggregate statistics using neural networks, in accordance with some implementations of the present disclosure. Depicted in FIG. 3 is a set of sensor statistics 202 which may be derived from sensors 114 via one or more intermediate operations. For example, the SCM 120 may identify a time horizon (e.g., 30 seconds, three minutes, etc.), which may be a full duration of a particular (e.g., ongoing or about to start) manufacturing operation or a selected time interval that is less (or more) than the full duration of the operation. The SCM 120 may further identify which sensors 114 may be activated (or sampled) for the anomaly detection during the current operation for the duration of the identified time horizon. The SCM 120 may collect M sets of data (e.g., data from M sensors) each set including N readings. The number of readings, which may be controlled by varying a data sampling rate, may be sensor-specific. In some implementations, the time horizon may also be sensor-specific, so that sensor 1 may provide $N_1$ readings over time $T_1$ whereas sensor 2 may provide $N_2$ readings over time $T_2$. Accordingly, the SCM 120 may collect multiple sets of data points $\{R_1\}$, wherein index j denotes a set of data points for the j-th sensor $1 \leq j \leq M$. Each set of data points may include a time series, $\{R_j\} = R_j(t_1), R_j(t_2), \ldots R_j(t_N)$, of data readings. Based on the raw sensor data sampled by the SCM 120, the SSM 122 may conduct statistical analysis of each of the obtained datasets $\{R_1\}$, to determine a set of statistical parameters $\{P_j\} = P_j(1), P_j(2), \ldots P_j(S)$ that describe the respective dataset. The set of statistical parameters is referred to as "sensor statistics" (e.g., sensor statistics 202) in the instant disclosure. For example, $P_j(1)$ may be a mean value of the j-th dataset, $P_j(2)$ may be a median value of the same dataset, $P_j(3)$ may be a mode, $P_j(4)$ may be a standard deviation, $P_j(4)$ may be a half-width, $P_j(5)$ may be a lower bound (minimum value), $P_j(6)$ may be an upper bound (maximum value), $P_j(7)$ may be a skewness, $P_j(8)$ may be a kurtosis, and so on.

The sensor statistics 202 (e.g., sets of parameters $\{P_j\}$) may be input into the pre-processing module 210, to filter out or otherwise account for various artifacts in the sensor data. In some implementations, the raw data (e.g., datasets $\{R_j\}$) from sensors 114 may also be provided to the pre-processing module 210. Some of the features of the sensor statistics 202 may be representative of the anomalies of the manufacturing process, which are intended to be detected. Some of the features of the sensor statistics 202, however, may be indicative of various events that are not representative of any actual problems or deficiencies of the manufacturing processes, but could otherwise be detected as problematic, if the existence of such events is not properly taken into account. For example, the manufacturing machine 100 might have undergone a maintenance (preventive, scheduled, or unplanned) procedure. During the maintenance procedure, one or more sensors 114 might have been exposed to a changed environment. Because sensors 114 are often miniature devices, the settings of the sensors (e.g., zero points) may change, as a result of such exposure. The sensor data may, therefore, shift substantially but such shifts may not be representative of any manufacturing process anomalies. In some implementations, the shifts in the sensor statistics 202 may be indicative of intentional changes to the manufacturing process. For example, an operator (e.g., user) of the manufacturing machine 100 may change a set point of one or more conditions inside the processing chamber 106, such as a change in temperature, gas flow rate, chemical composition or concentration of the gas delivered into the processing chamber 106. In some implementations, a change in the sensor statistics 202 can be triggered by a change in the settings of one or more hardware devices in the processing chamber, such as a replacement of a process kit (e.g., an edge ring or the like).

In such instances, the computing device 101 may detect an occurrence of an artifact event (maintenance, change in process set points, changes in the hardware settings, etc.) and notify the SCM 120 about the event. The SSM 122 may receive an indication of the event (e.g., a robot blade removing an old edge ring and delivering a new edge ring (at a specified time) into the processing chamber 206. The SSM 122 may correlated the changes in the sensor statistics 202 in the time interval following the artifact event and adjust the statistics 202 to remove (or compensate for) the changes in the sensor statistics caused by the artifact event. For example, the SSM 122 may determine a new mean of the distribution of the affected sensors (which could be any sensors whose readings have shifted at or after the artifact event) and recalculate the sensor statistics based on the new mean. In some implementations, the pre-processing module 210 may remove outliers, invalid values (such as Not-a-Number values) or, conversely, impute (add) missing values. The sensor statistics corrected in the described (or a similar) way may be output by the pre-processing module 210 in the form of the sets of adjusted parameters $\{P_j\}$ reflecting the corrected (adjusted to compensate for the influence of the artifact events) sensor statistics 202. The adjusted parameters {$P_j$} may constitute a representation of the sensor statistics that is referred to in the instant disclosure as the initial representation 315 of the sensor statistics (even though the representation 315 may not be the earliest representation of the statistics generated by the SSM 122).

The initial representation 315 may be aggregated across some or all of the sensor statistics. Because different sensors statistics may be related to different quantities, including quantities measured in different units (e.g., temperature, pressure, gas flow, wafer thickness, reflectivity of the wafer surface, etc.), the sensor statistics may be normalized prior to aggregation. For example, the variance may first be expressed in units of the mean value squared whereas the third moment or cumulant (e.g., skewness) may be expressed in units of the mean cubed, and so on.

In some implementations, the initial representation 315 may be processed by the reducer neural network 220 to obtain a reduced representation 325 of the sensor statistics. The input to the reducer 220 may be an aggregated set of initial representations 315 of the sensor statistics. The initial representations 315 may contain a large amount of information only a fraction of which may be representative of a manufacturing anomaly. Accordingly, the function of the reducer 220 may be two-fold: to improve signal-to-noise ratio by distilling the initial representation 315 to the most representative features of the data statistics and to reduce the number of parameters describing the sensor statistics to a set that is more manageable and more amenable to further processing. The reducer neural network 220 may be an auto-encoder, in one implementation. In another implementation, the reducer neural network 220 may be an extreme learning machine. The reducer neural network 220 may be trained to output a reduced representation 325 having a number of dimensions that is lower (in some implementations, significantly lower) than the initial representation. For example, the reducer neural network 220 may use one of algorithms based on the Principal Component Analysis (PCA) to identify the most significant and representative (for the subsequent anomaly detection) features of the initial representation. In particular, PCA algorithms may find a transformation of the coordinate space of the initial representation 315 along which the variance of data points is maximized (principal axes) and select a certain number (determined and optimized during training) of the maximum variance axes, e.g., D. For each of the axes, the output can include one or more statistical parameters (mean, variance, etc.) for each of the principal axes, and a number of covariance parameters characterizing cross-correlations among statistical parameters relating to various axes. The advantage of using the reducer neural network 220 is that it allows to reduce the number of sensor statistics from, potentially, thousands of parameters to only a few (e.g., five, ten, twenty, and so on) key components, which represent critical variation of the sensor data and, at the same, time reduce noise. The use of the reducer 220 increase efficacy of the subsequent anomaly detection algorithms (as described in relation to FIG. 4). In some implementations, the reducer 220 may process all or some initial representations 315 of the sensor statistics concurrently.

Figure 4:
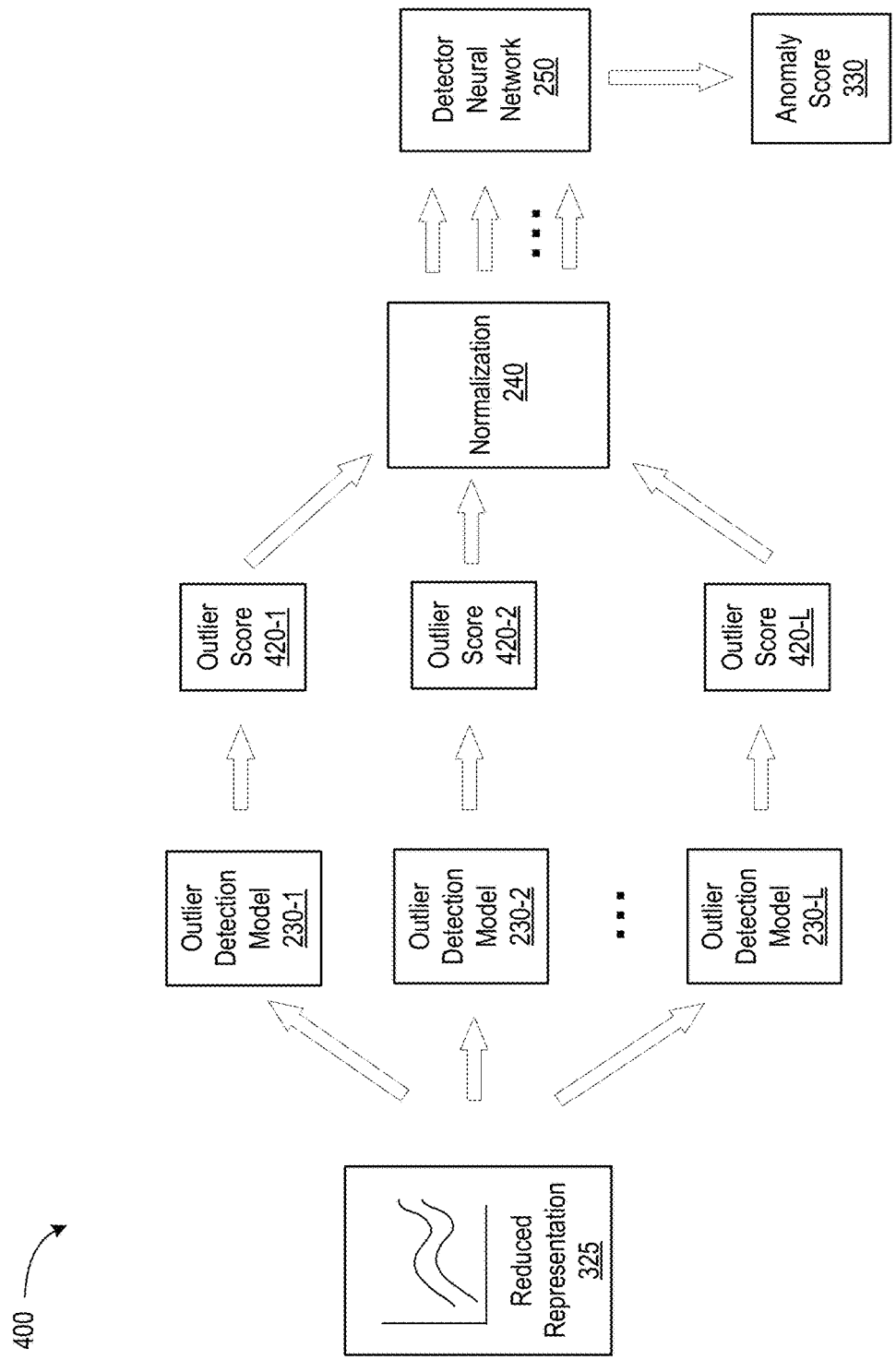
FIG. 4 is an exemplary illustration of a detection stage of anomaly detection based on aggregate statistics using neural networks, in accordance with some implementations of the present disclosure.

FIG. 4 is an exemplary illustration of a detection stage 400 of anomaly detection based on aggregate statistics using neural networks, in accordance with some implementations of the present disclosure. Depicted in FIG. 4 is the reduced representation 325 of the sensor statistics being input into a set of the outlier detection models 230 (e.g. models 230-1, 230-2 ... 230-L). Some or all of the outlier detection models 230 may employ a variety of algorithms, such as k-nearest neighbor outlier detection algorithms, clustering-based algorithms, mixture-based algorithms (e.g., a Cluster-Based Local Outlier Factor algorithm), embedding-based algorithms, decision-tree algorithms, support vector machine-based algorithms, histogram-based outlier score algorithms, principle component analysis algorithms, local outlier factor algorithms, local distance-based outlier detection algorithms, local outlier integral algorithms, and the like.

Each of the outlier detection models 230 applied to the reduced representation 325 may output a respective outlier score 420 indicative of the presence of various anomalies in the sensor statistics, according to the criteria of the respective outlier detection model 230. The outlier scores 420, being determined by different algorithms, may have values that are difficult to compare to each other directly. To make the outlier scores 420 better suited for subsequent uniform processing, the outlier scores 420 may be normalized by the normalization module 240. In some implementations, the normalization module 240 may perform a rescaling of the outlier scores 420. For example, if the maximum outlier value (e.g., a maximum value for a set of training sensor statistics, or a set of the actual run-time sensor statistics, or a combination thereof) is $O_{max}$ and the minimum outlier value is $O_{min}$, the normalized outlier score may be determined as $$O_{norm} = \frac{O - O_{min}}{O_{max} - O_{min}}.$$

The uniform normalization brings all outlier scores to within the interval of values [0,1], but does not account for the fact that the outlier scores O may be distributed non-uniformly within the interval [$O_{min}$, $O_{max}$]. In some implementations, it may be difficult to predict what minimum or maximum outlier scores may be encountered in actual processing, so that other methods, e.g., as described below, may be used instead.

Accordingly, in some implementations, the normalization may instead be performed using an assumption (an approximation or a hypothesis) of some underlying distribution of the outlier scores O. For example, accounting for a Gaussian distribution of the outlier scores may be performed by determining the normalized outlier score according to the formula:

$$O_{norm} = \max\left\{0, Erf\left(\frac{O - O_{mean}}{\sigma\sqrt{2}}\right)\right\},$$

where $O_{mean}$ is the mean outlier score and σ is the standard deviation for the outlier scores (e.g., the mean value for a set of training sensor statistics, or a set of the actual sensor statistics, or a combination thereof), and Erf is the Gauss error function.

In some implementations, the normalization may be performed using the assumption of a Gamma distribution of the outlier scores according to the following formula:

$$O_{norm} = \max\left\{0, \frac{F(O) - F(O_{mean})}{1 - F(O_{mean})}\right\},$$

where F(O) is the cumulative distribution function for the Gamma distribution, e.g., $$F(O) = \frac{\gamma\left(\frac{O_{mean}^2}{\sigma^2}, O \cdot \frac{O_{mean}^2}{\sigma^2}\right)}{\gamma\left(\frac{O_{mean}^2}{\sigma^2}\right)},$$

with $\Gamma(x)$ being the Gamma function and $y(x, y)$ being the incomplete Gamma function.

The above non-limiting examples are intended as illustrations only. In various implementations, different underlying distributions may be used and the respective distribution-based normalization schemes may be different. In some implementations, a mixture of two or more probability distributions may be used to normalize the outlier scores 420.

The normalized outlier scores $O_{norm-1}$, $O_{norm-2}$, ... $O_{norm-L}$ obtained from all (or some of) the L outlier detection models 230 may be used as an input into the neural network detector 250 ("detector") to determine the anomaly score. The detector 250 may be trained on a variety of training sensor statistics 282 using methods of deep learning. The detector 250 may be a Boltzmann machine, a convolutional neural network, a recurrent neural network, a fully connected neural network, or some other type of deep learning neural networks. The output of the detector 250 may be an anomaly score 330 indicating a likelihood that an anomaly is present in the input set of sensor statistics 202.

Figure 5:
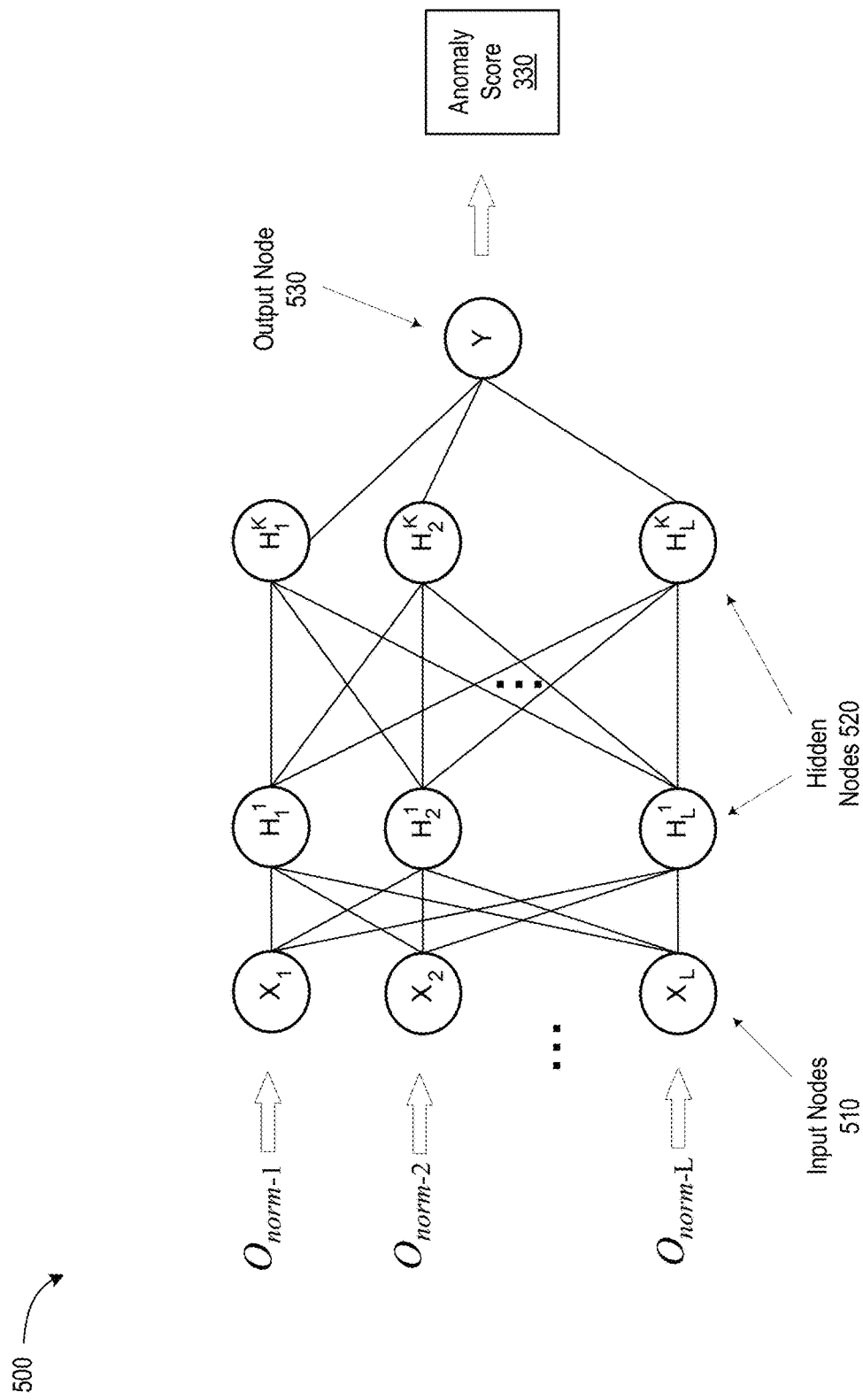
FIG. 5 is an exemplary neural network that operates as a detector neural network used in the detection stage of anomaly detection based on aggregate statistics using neural networks, in accordance with some implementations of the present disclosure.

FIG. 5 is an exemplary neural network 500 that operates as a detector neural network 250 used in the detection stage of anomaly detection based on aggregate statistics using neural networks, in accordance with some implementations of the present disclosure. Depicted in FIG. 5 are the normalized outlier scores $O_{norm-1}$, $O_{norm-2}$, $O_{norm-L}$ input into a plurality of input nodes (neurons) $X_j$ 510-1, 510-2 ... 510-L) of the detector 250. In some implementations, the neural network 500 may be a restricted Boltzmann machine (RBM). The input normalized outlier scores may be processed by one or more hidden layers having hidden nodes (neurons) 520. Each hidden node 520 may be associated with a hidden variable $H_j^k$. Connections between adjacent columns of the RBM may have associated weights described by a weight matrix $W_{lm}$ having a value corresponding to a connection between l-th node of one layer with the m-th node of the adjacent layer. In the implementation depicted in FIG. 5, the weight matrix between the input and hidden layers are square matrices (since the number of nodes in each layer is L), but in other implementations, the number of nodes in each consecutive layer may be different from the number of nodes in the previous layer. Additionally, each layer may be associated with a set (vector, column) of biases $b_1, b_2, \ldots$ The RBM may be described by the "energy" symbolically written in the form, $$E(\{X_j\},\{H_j^k\}) = \hat{b} \cdot \hat{\xi} - \hat{\xi} \cdot \hat{W} \cdot \hat{\xi},$$

where $\hat{\xi}$ denotes the vectors of variables (input X or hidden H) in various layers of the RGB, $\hat{b}$ denotes the biases associated with the corresponding variables (nodes), and $\hat{W}$ stands for the weight matrices between the layers. The energy determines the probability of the configuration $\{X_j\}$, $\{H_j^k\}$ according to the Boltzmann distribution, $$P(\{X_j\},\{H_j^k\}) = Z^{-1} \exp(-E(\{X_j\},\{H_j^k\})),$$

where Z is the partition function (normalization coefficient). Training of a two-layer RBM may be performed using training input vectors (outlier scores) where (1) the hidden variables are statistically determined from the input outlier scores, and (2) the hidden variables are used to reversely predict the value of the input nodes (this (1)+(2) procedure may be repeated a pre-set number of times) before the reversely-predicted input variables are compared to the actual input variables and the biases and weights of the RBM are adjusted until the two sets of the input variables are sufficiently close to each other (e.g., less than a pre-determined accuracy threshold).

In a deep learning RGB with multiple hidden layers, as depicted in FIG. 5, for example, a hidden layer is an input into the successive hidden layer. In some implementations, the hidden layers of the RGB are trained one at a time, e.g., from left to right, in a layer-wise fashion. Specifically, the hidden variables $H_1^2, H_2^2 \ldots H_L^2$ are determined from the values $H_1^1, H_2^1 \ldots H_L^1$, and so on. Such RGB architecture may be capable of disentangling factors of variation in the inputs. Namely, with the propagation through the RGB the hidden nodes may become less statistically dependent. Propagation of the data through the RGB may, therefore, reduce the conditional dependence of the nodes while preserving most of the information about the anomaly score that is output by the output node Y 530. The output node 530 may be viewed as a single-node hidden layer whose weights and a bias may be determined using the same procedures as described in relation to the hidden nodes 520.

Figure 6:
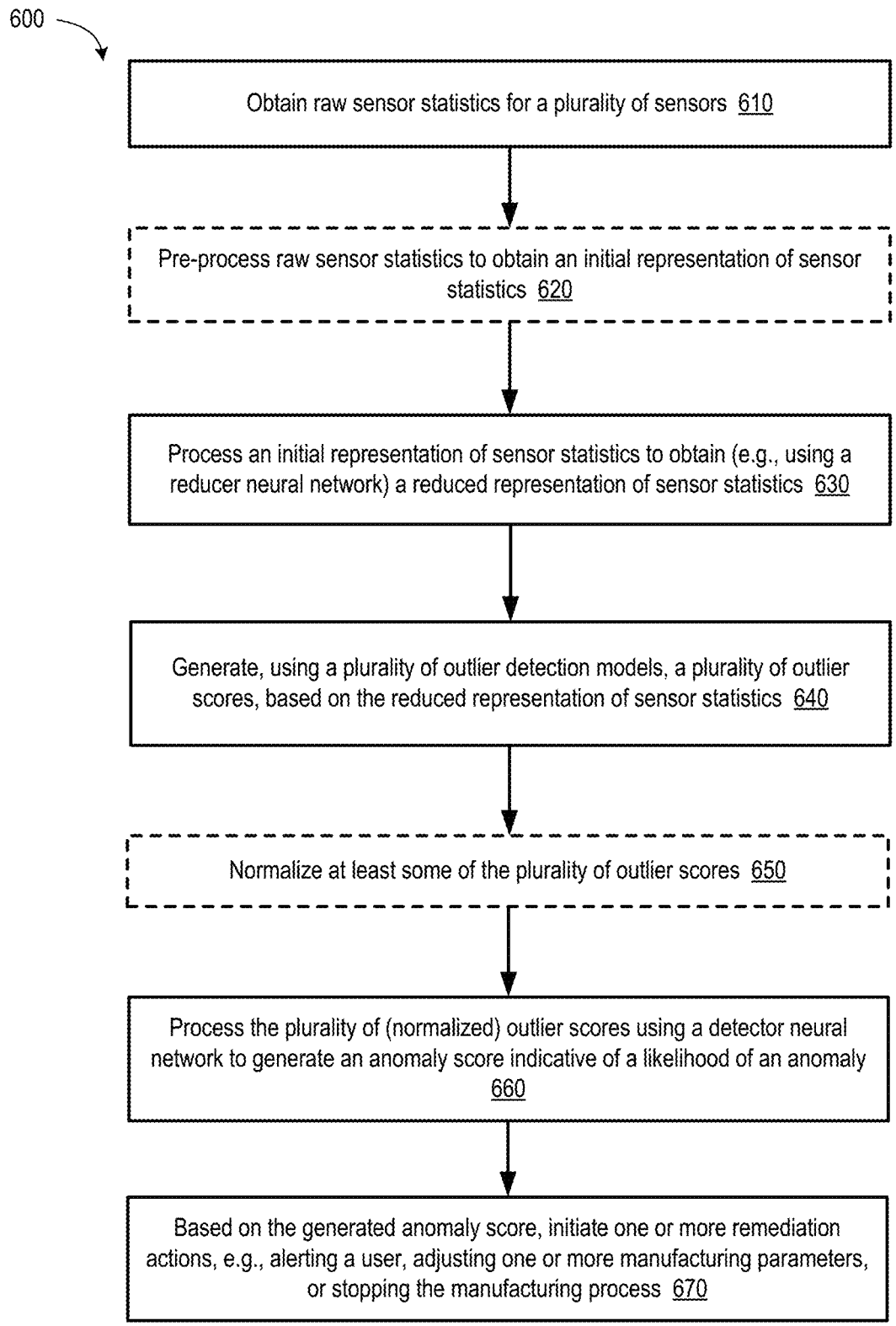
FIG. 6 is a flow diagram of one possible implementation of a method of anomaly detection based on aggregate statistics using neural networks, in accordance with some implementations of the present disclosure.

FIG. 6 is a flow diagram of one possible implementation of a method 600 of anomaly detection based on aggregate statistics using neural networks, in accordance with some implementations of the present disclosure. Method 600 may be performed using systems and components shown in FIGS. 1-5 or any combination thereof. Method 600 may be performed using a single processing device or a plurality of processing devices. Some of the operations of method 600 may be optional. In some implementations, some operations of method 600 may be performed by a processing device (processor, central processing unit (CPU)) of the computing device 101, e.g., responsive to instructions output by the anomaly detection module (ADM) 124. In some implementations, some of the operations of method 600 may be performed by the electronics module 150. The computing device 101 may have one or more CPUs coupled to one or more memory devices. Method 600 may be performed without taking the manufacturing system (such as the manufacturing machine 100) off the production process. In some implementations, method 600 may be implemented when a wafer is being transported, e.g., by the robot blade 110 of the robot 108, between various chambers of the manufacturing machine 100. In some implementations, method 600 may be implemented while a wafer is being processed in one of the processed chambers 106. For example, the wafer may be undergoing chemical or physical vapor deposition, etching, masking, cooling, heating, or any other manufacturing operations. Method 600 may determine if the wafer processing has some anomaly that may affects a quality of the products of the manufacturing process. The anomaly detection may be performed while the wafer is inside the transfer chamber 104 or while the wafer is inside the loading station 102. The anomaly detection may be performed over a period that spans a single manufacturing operation (e.g., etching) or multiple manufacturing operations (e.g., heating the wafer, performing chemical deposition, cooling the wafer, transporting the wafer between processing chambers, and so on).

The anomaly detection inspection may be performed without delaying the manufacturing process.

Method 600 may involve a processing device (e.g., the CPU of the computing device 101) obtaining raw sensor statistics for a plurality of sensors (e.g., sensors 114) collecting data during the duration of the processing operation(s) subject to anomaly detection (block 610). The set of sensors activated (or collecting data) during the processing operation(s) may be selected by the processing device based on the specifics of the processing operation(s). The raw sensor statistics may characterize a plurality of measurements associated with the activated (sampled) sensors. The statistics describing measurements collected by each or some of the sensors may include various parameters, such as a median, a mode, a variance, a standard deviation, a range, a maximum, a minimum, a skewness, or a kurtosis. At block 620, method 600 may continue with the processing device pre-processing raw sensor statistics for each or some of the plurality of sensors. Pre-processing may involve adjusting the raw sensor statistics in view of various preventive maintenance events, such as changes of settings of the manufacturing operation, or changes in settings of the device manufacturing system. The output of the pre-processing may be an initial representation of the sensor statistics. The initial representation may be an aggregate representation of the sensor statistics.

At block 630, method 600 may continue with the processing device obtaining a reduced representation of the sensor statistics reflective of the data collected by the sensors. In some implementations, the reduced representation of the sensor statistics may be obtained by processing the initial representation of the plurality of sensor statistics using a reducer neural network. In some implementations, the reducer neural network may be a feed-forward neural network. The reduced representation may have fewer parameters than the initial representation.

At block 640, method 600 may continue with the processing device generating a plurality of outlier scores. Each of the plurality of the outlier scores may be obtained by executing a respective outlier detection model. The input into the outlier detection models may be the reduced representation of the sensor statistics. At block 650, the processing device may normalize at least some of the outlier scores.

At block 660, method 600 may continue with the processing device processing the plurality of normalized outlier scores using a detector neural network. The detector neural network may be a reduced Boltzmann machine network. In some implementations, the reduced Boltzmann machine network has two or more hidden layers to generate an anomaly score indicative of a likelihood of an anomaly associated with the manufacturing operation.

At block 670, the processing device performing method 600 may analyze the generated score and take (or abstain from taking) one or more remediation actions. Specifically, if the anomaly score is below a certain predetermined threshold, the processing device may take no remediation action and/or, optionally, provide the anomaly score to the user (engineer, or any other operator of the manufacturing process). In those instances, where the anomaly score is above the threshold, the processing device may initiate one or more remediation actions. For example, the processing device may alert the user and advice the user of various corrective options, such as changing parameters of the manufacturing process, pausing the manufacturing process (e.g., for a quick maintenance), stopping the manufacturing process (e.g., for more extensive repairs), or the like. In some implementations, the processing device can take multiple remediation actions, e.g., adjust settings of the manufacturing process, schedule maintenance, and alert the user.

Figure 7:
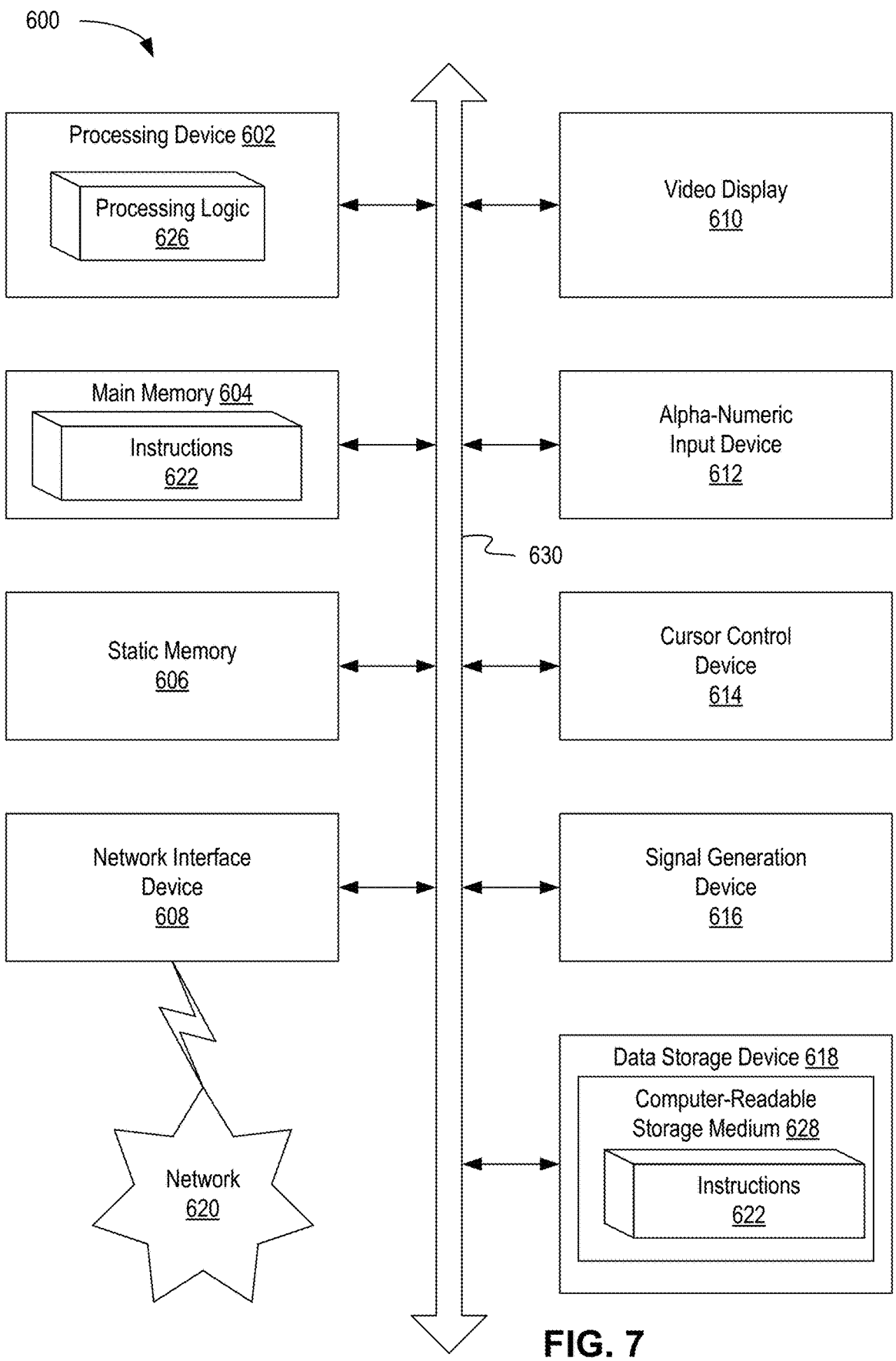
FIG. 7 depicts a block diagram of an example processing device operating in accordance with one or more aspects of the present disclosure and capable of anomaly detection based on aggregate statistics using neural networks, in accordance with some implementations of the present disclosure.

FIG. 7 depicts a block diagram of an example processing device 700 operating in accordance with one or more aspects of the present disclosure and capable of anomaly detection based on aggregate statistics using neural networks, in accordance with some implementations of the present disclosure. The processing device 700 may be the computing device 101 or a microcontroller of the electronics module 150 of FIG. 1, in one implementation.

Example processing device 700 may be connected to other processing devices in a LAN, an intranet, an extranet, and/or the Internet. The processing device 700 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 700 may include a processor 702 (e.g., a CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processor 702 represents one or more general-purpose processing devices such as a microprocessor, central processing unit, or the like. More particularly, processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 702 may be configured to execute instructions implementing method 600 of anomaly detection based on aggregate statistics using neural networks.

Example processing device 700 may further comprise a network interface device 708, which may be communicatively coupled to a network 720. Example processing device 700 may further comprise a video display 710 (e.g., a liquid crystal display (LCD), a touch screen, or a cathode ray tube (CRT)), an alphanumeric input device 712 (e.g., a keyboard), an input control device 714 (e.g., a cursor control device, a touch-screen control device, a mouse), and a signal generation device 716 (e.g., an acoustic speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing method 600 of anomaly detection based on aggregate statistics using neural networks.

Executable instructions 722 may also reside, completely or at least partially, within main memory 704 and/or within processing device 702 during execution thereof by example processing device 700, main memory 704 and processor 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method, comprising:
  obtaining a reduced representation of a plurality of sensor statistics representative of data collected by a plurality of sensors associated with a device manufacturing system performing a manufacturing operation;
  generating, using a plurality of outlier detection models, a plurality of outlier scores, wherein one or more of the plurality of outlier scores are representative of a degree of presence, in the plurality of sensor statistics, of an anomaly associated with the manufacturing operation, and wherein each of the plurality of outlier scores is generated based on the reduced representation of the plurality of sensor statistics using a respective one of the plurality of outlier detection models; and
  processing the plurality of outlier scores using a detector neural network to generate an anomaly score indicative of a likelihood of the anomaly associated with the manufacturing operation.

2. The method of claim 1, wherein the reduced representation of the plurality of sensor statistics is obtained by processing an initial representation of the plurality of sensor statistics using a reducer neural network, wherein the initial representation comprises a plurality of sets of statistical parameters, wherein each set of the plurality of sets of statistical parameters is obtained by pre-processing raw sensor statistics for a respective one of the plurality of sensors, and wherein the reduced representation has fewer parameters than the initial representation.

3. The method of claim 2, wherein the initial representation is an aggregate representation of the plurality of sensor statistics.

4. The method of claim 2, wherein the raw sensor statistics characterizes a plurality of measurements associated with the respective one of the plurality of sensors.

5. The method of claim 2, wherein the reducer neural network is a feed-forward network.

6. The method of claim 2, wherein pre-processing of the raw sensor statistics comprises adjusting the raw sensor statistics in view of at least some of one or more preventive maintenance events, one or more changes in settings of the manufacturing operation, or one or more changes in settings of the device manufacturing system.

7. The method of claim 2, wherein at least some of the plurality of sets of statistical parameters comprise one or more of a mean, a median, a mode, a variance, a standard deviation, a range, a maximum, a minimum, a skewness, or a kurtosis for the pre-processed raw sensor statistics for the respective one of the plurality of sensors.

8. The method of claim 1, wherein prior to processing the plurality of outlier scores, at least some of the plurality of outlier scores are normalized.

9. The method of claim 1, further comprising performing an anomaly remediation action for the device manufacturing system in response to the anomaly score indicating a presence of an anomaly.

10. A system comprising:
a memory; and
a processing device operatively coupled to the memory, the processing device to:
obtain a reduced representation of a plurality of sensor statistics representative of data collected by a plurality of sensors associated with a device manufacturing system performing a manufacturing operation;
generate, using a plurality of outlier detection models, a plurality of outlier scores, wherein one or more of the plurality of outlier scores are representative of a degree of presence, in the plurality of sensor statistics, of an anomaly associated with the manufacturing operation, and wherein each of the plurality of outlier scores is generated based on the reduced representation of the plurality of sensor statistics using a respective one of the plurality of outlier detection models; and
process the plurality of outlier scores using a detector neural network to generate an anomaly score indicative of a likelihood of an anomaly associated with the manufacturing operation.

11. The system of claim 10, wherein the reduced representation of the plurality of sensor statistics is obtained by processing an initial representation of the plurality of sensor statistics using a reducer neural network, wherein the initial representation comprises a plurality of sets of statistical parameters, wherein each set of the plurality of sets of statistical parameters is obtained by pre-processing raw sensor statistics for a respective one of the plurality of sensors, and wherein the reduced representation has fewer parameters than the initial representation.

12. The system of claim 11, wherein the raw sensor statistics characterizes a plurality of measurements associated with the respective one of the plurality of sensors.

13. The system of claim 11, wherein pre-processing of the raw sensor statistics comprises adjusting the raw sensor statistics in view of at least some of one or more preventive maintenance events, one or more changes in settings of the manufacturing operation, or one or more changes in settings of the device manufacturing system.

14. The system of claim 11, wherein at least some of the plurality of sets of statistical parameters comprise one or more of a mean, a median, a mode, a variance, a standard deviation, a range, a maximum, a minimum, a skewness, or a kurtosis for the pre-processed raw sensor statistics for the respective one of the plurality of sensors.

15. The system of claim 10, wherein the detector neural network is a reduced Boltzmann machine network.

16. The system of claim 10, wherein prior to processing the plurality of outlier scores, at least some of the plurality of outlier scores are normalized.

17. A non-transitory computer readable storage medium comprising instructions that, when executed by at least one processing device, cause the at least one processing device to:
obtain a reduced representation of a plurality of sensor statistics representative of data collected by a plurality of sensors associated with a device manufacturing system performing a manufacturing operation;
generate, using a plurality of outlier detection models, a plurality of outlier scores, wherein each of the plurality of outlier scores is representative of a degree of presence, in the plurality of sensor statistics, of an anomaly associated with the manufacturing operation, and wherein one or more of the plurality of outlier scores are generated based on the reduced representation of the plurality of sensor statistics using a respective one of the plurality of outlier detection models; and
process the plurality of outlier scores using a detector neural network to generate an anomaly score indicative of a likelihood of an anomaly associated with the manufacturing operation.

18. The non-transitory computer readable medium of claim 17, wherein the reduced representation of the plurality of sensor statistics is obtained by processing an initial representation of the plurality of sensor statistics using a reducer neural network, wherein the initial representation comprises a plurality of sets of statistical parameters, wherein each set of the plurality of sets of statistical parameters is obtained by pre-processing raw sensor statistics for a respective one of the plurality of sensors, and wherein the reduced representation has fewer parameters than the initial representation.

19. The non-transitory computer readable medium of claim 17, wherein the instructions are further to cause the at least one processing device to perform an anomaly remediation action for the device manufacturing system in response to the anomaly score indicating a presence of an anomaly.

20. The non-transitory computer readable medium of claim 17, wherein prior to processing the plurality of outlier scores, at least some of the plurality of outlier scores are normalized.

* * * * *